United States Patent
Kemper et al.

(10) Patent No.: US 7,673,458 B2
(45) Date of Patent: Mar. 9, 2010

(54) TURBOFAN ENGINE NOZZLE ASSEMBLY AND METHOD FOR OPERATING THE SAME

(75) Inventors: Paul D. Kemper, Loveland, OH (US); Thomas Ory Moniz, Loveland, OH (US); Jorge Francisco Seda, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 785 days.

(21) Appl. No.: 11/559,774

(22) Filed: Nov. 14, 2006

(65) Prior Publication Data

US 2008/0110152 A1 May 15, 2008

(51) Int. Cl.
*F02K 1/00* (2006.01)

(52) U.S. Cl. .............. 60/770; 60/771; 60/226.1; 239/265.19

(58) Field of Classification Search ........... 60/226.1, 60/770, 771, 226.3, 262; 239/265.19; 244/54; 248/554
See application file for complete search history.

(56) References Cited

U.S. PATENT DOCUMENTS

| | | | | |
|---|---|---|---|---|
| 3,015,936 A | * | 1/1962 | Brewer et al. | 239/265.19 |
| 3,018,620 A | * | 1/1962 | Meyer | 239/265.19 |
| 4,043,508 A | * | 8/1977 | Speir et al. | 239/265.19 |
| 4,077,206 A | * | 3/1978 | Ayyagari | 60/262 |
| 5,221,048 A | | 6/1993 | Lair | |
| 5,251,435 A | | 10/1993 | Pauley | |
| 5,372,006 A | * | 12/1994 | Lair | 60/226.2 |
| 5,746,047 A | * | 5/1998 | Steyer et al. | 60/39.5 |
| 5,785,249 A | * | 7/1998 | Metezeau et al. | 239/265.19 |
| 5,799,903 A | * | 9/1998 | Vauchel | 244/110 B |
| 5,833,140 A | | 11/1998 | Loffredo et al. | |
| 5,853,148 A | | 12/1998 | Standish et al. | |
| 5,996,937 A | * | 12/1999 | Gonidec et al. | 244/110 B |
| 6,253,540 B1 | * | 7/2001 | Chew et al. | 60/262 |
| 6,546,716 B2 | | 4/2003 | Lair | |
| 6,820,410 B2 | | 11/2004 | Lair | |
| 6,938,408 B2 | | 9/2005 | Lair | |
| 6,945,031 B2 | * | 9/2005 | Lair | 60/226.1 |
| 7,430,852 B2 | * | 10/2008 | Beutin et al. | 60/226.1 |
| 2008/0112801 A1 | * | 5/2008 | Moniz et al. | 415/208.1 |

* cited by examiner

*Primary Examiner*—William H Rodríguez
(74) *Attorney, Agent, or Firm*—William Scott Andes, Esq.; Armstrong Teasdale LLP

(57) ABSTRACT

A method for operating a turbofan engine assembly including a core gas turbine engine is provided. The method includes varying an operating speed of the turbofan engine assembly from a first operating speed to a second operating speed. The method also includes selectively positioning a first arcuate portion and a second arcuate portion of a split cowl assembly to vary a throat area of a fan nozzle duct defined downstream from the core gas turbine engine to facilitate improving engine efficiency at the second operating speed. The split cowl assembly is downstream from the core gas turbine engine and inside the fan nozzle duct. A turbofan engine assembly and nozzle assembly are also provided.

19 Claims, 8 Drawing Sheets

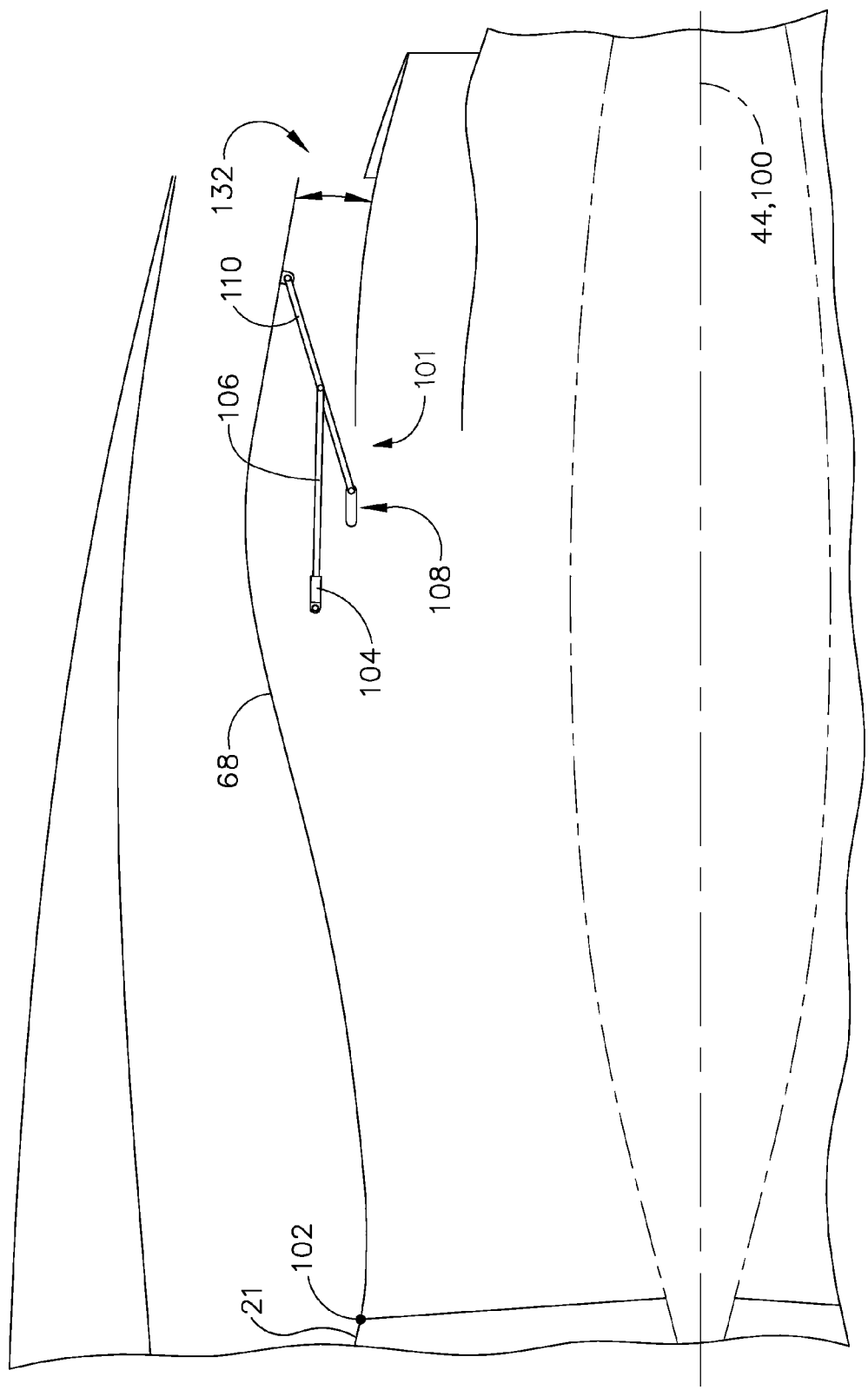

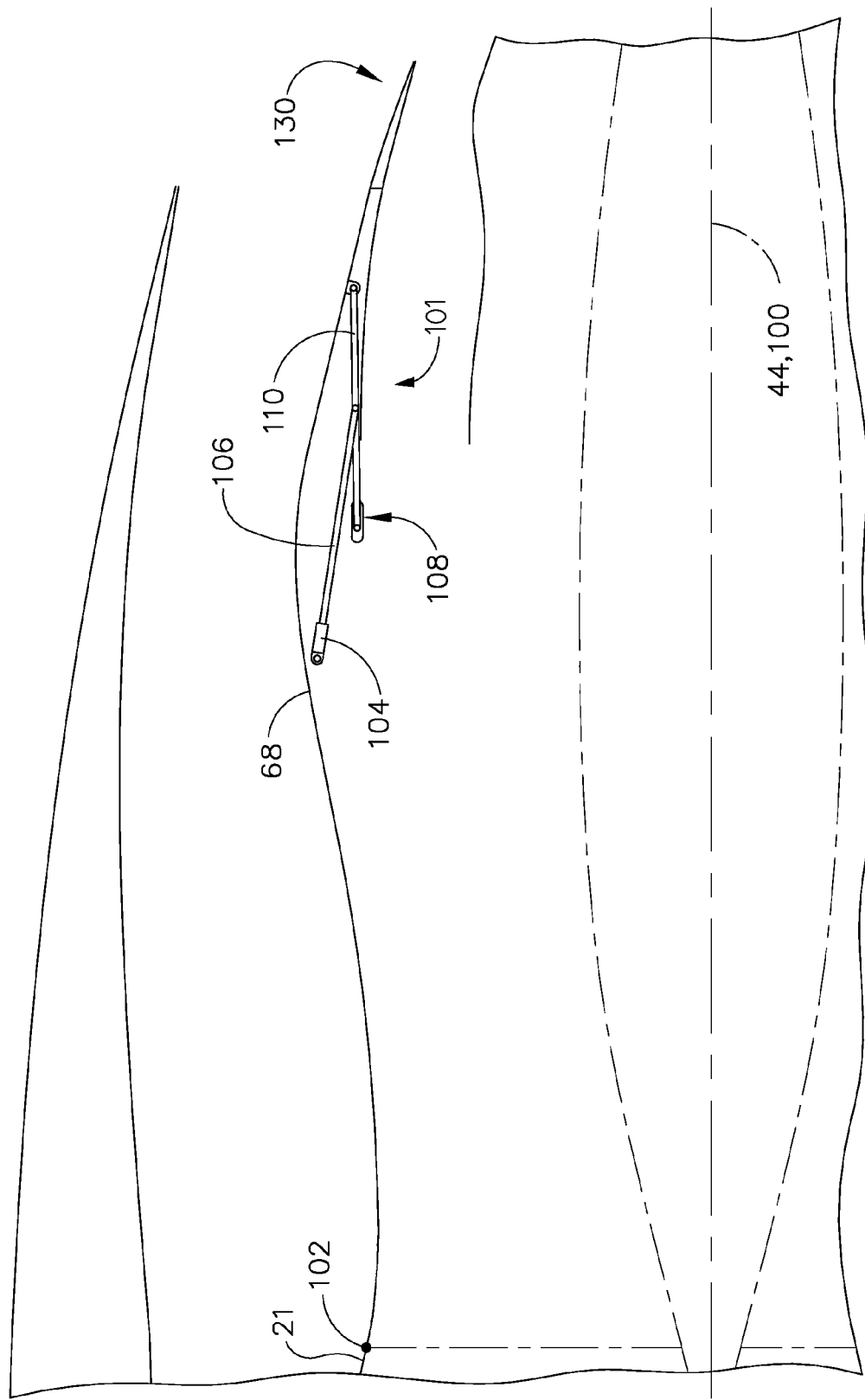

TURBOFAN ENGINE NOZZLE ASSEMBLY AND METHOD FOR OPERATING THE SAME

BACKGROUND OF THE INVENTION

This invention relates generally to airflow in turbofan engines, and, more specifically, to regulating the airflow through the fan duct area.

At least one known turbofan engine assembly includes a fan assembly and a core gas turbine engine enclosed in an annular core cowl. Additionally, a fan nacelle surrounds a portion of the core gas turbine engine. A nozzle assembly includes portions of the core cowl and the fan nacelle and generally defines a fan nozzle duct area (A18). While operating the turbofan engine assembly, a portion of the air flowing from the fan assembly flows through the core gas turbine engine and another portion of the air flows through the nozzle assembly.

In some turbofan engine nozzle assemblies, the fan nozzle duct area can be manipulated in order to alter engine performance. For example, some turbofan engines utilize a translating core cowl as a thrust reverser without blocker doors by essentially reducing the fan nozzle duct area.

BRIEF DESCRIPTION OF THE INVENTION

In one aspect, a method for operating a turbofan engine assembly including a core gas turbine engine is provided. The method includes varying an operating speed of the turbofan engine assembly from a first operating speed to a second operating speed. The method also includes selectively positioning a first arcuate portion and a second arcuate portion of a split cowl assembly to vary a throat area of a fan nozzle duct defined downstream from the core gas turbine engine to facilitate improving engine efficiency at the second operating speed. The split cowl assembly is downstream from the core gas turbine engine and inside the fan nozzle duct.

In another aspect, a nozzle assembly for a gas turbine aircraft engine is provided. The nozzle assembly includes a nacelle, a core cowl positioned at least partially within the nacelle such that an annular bypass fan duct is defined between the nacelle and the core cowl. The core cowl and the nacelle are aligned substantially concentrically with respect to each other. The core cowl includes a first cowl portion positioned within the nacelle and a split cowl assembly extending downstream from the first cowl portion. The split cowl assembly includes a pair of arcuate portions that are each repositionable within the bypass fan duct to vary an area of the bypass fan duct.

In another aspect, a turbofan engine assembly is provided. The turbofan engine assembly includes a core gas turbine engine, a nacelle, and a core cowl positioned at least partially within the nacelle such that an annular bypass fan duct is defined between the nacelle and the core cowl. The core cowl and the nacelle are aligned substantially concentrically with respect to each other. The core cowl includes a first cowl portion positioned within the nacelle and a split cowl assembly extending downstream from the first cowl portion. The split cowl assembly includes a pair of arcuate portions that are each repositionable within the bypass fan duct to vary an area of the bypass fan duct.

BRIEF DESCRIPTION OF THE DRAWINGS

FIG. 7 illustrates a partial outline view of the nozzle assembly shown in FIG. 3 in the second operational position; and FIG. 8 illustrates a partial outline view of the nozzle assembly shown in FIG. 3 in the first operational position.

DETAILED DESCRIPTION OF THE INVENTION

The present invention relates to turbofan engines and nozzle assemblies. As used herein, "nozzle assembly" is directed to a portion of the turbofan engine that includes at least the aft portion, and also includes portions/sections of the nacelle, core cowl, and fan and exhaust ducts.

Figure 1:
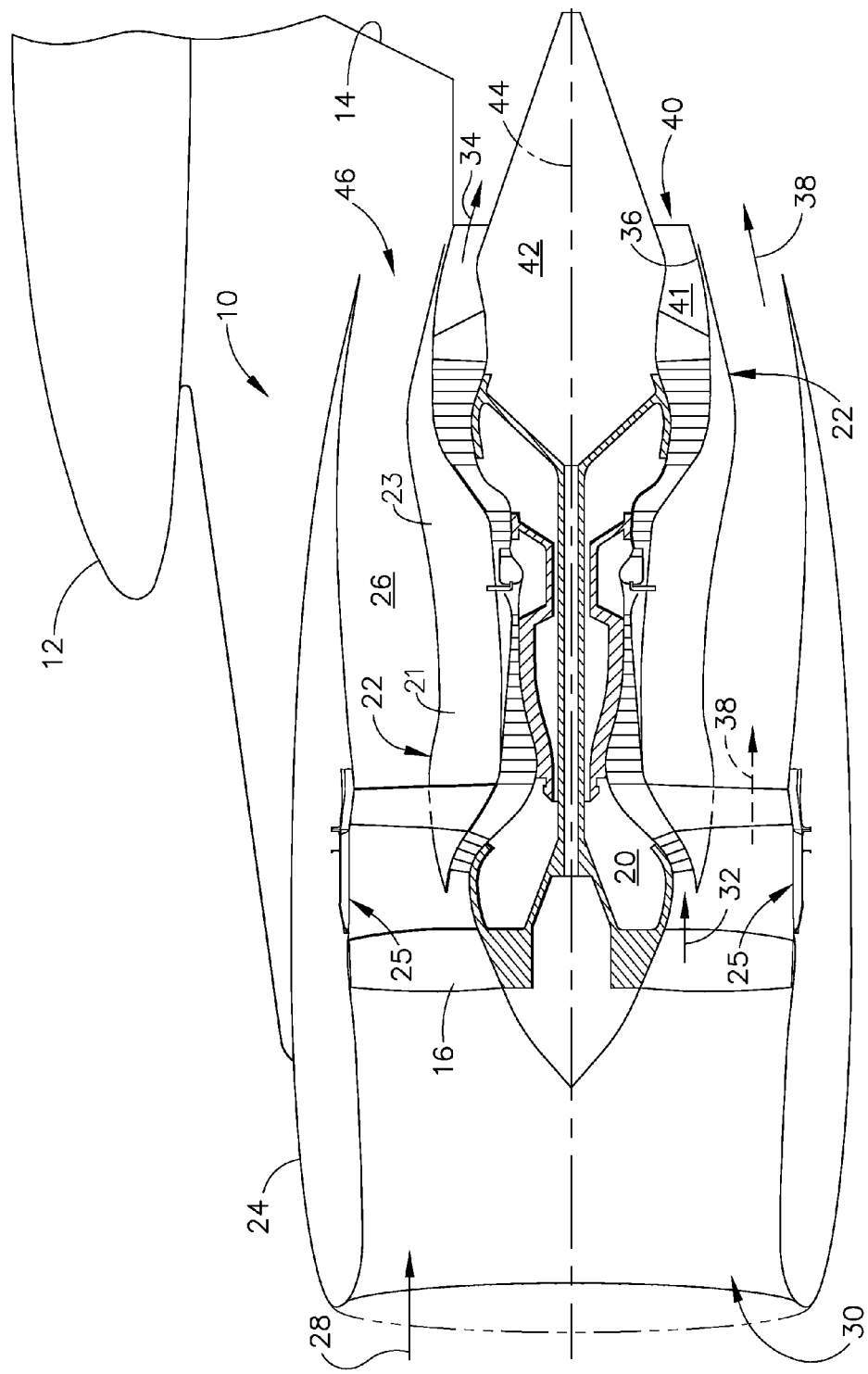
FIG. 1 is a schematic side view of an exemplary aircraft turbofan engine assembly.

FIG. 1 is a schematic side view of an exemplary aircraft turbofan engine assembly 10 having a longitudinal axis/centerline 44. Turbofan engine assembly 10 is mounted to a wing 12 of the aircraft using a pylon 14. In the exemplary embodiment, turbofan engine assembly 10 includes a core gas turbine engine 20 that includes a high-pressure compressor, a combustor, and a high-pressure turbine (all not shown). Turbofan engine assembly 10 also includes a low-pressure turbine that is disposed axially downstream from core gas turbine engine 20, and a fan assembly 16 that is disposed axially upstream from core gas turbine engine 20.

In the exemplary embodiment, core gas turbine engine 20 is enclosed in an annular core cowl 22. Nacelle 24 surrounds fan assembly 16 and a portion of the core cowl 22. A fan nozzle duct, or annular bypass duct 26, is defined between core cowl 22 and an inner surface 25 of nacelle 24. Core cowl 22 includes a front cowl portion 21 (or first cowl portion) and a split cowl assembly 23 (also referred to as a second cowl portion) coupled downstream to front cowl portion 21. Split cowl assembly 23 is divided into substantially symmetrical sections along a vertical plane defined by line 100 (shown in FIGS. 2 and 4). Core gas turbine engine 20 further includes a core nozzle 36 positioned at an aft end portion of turbine engine 20. An outer surface of core nozzle 36 lies adjacent to and is surrounded by split cowl assembly 23 when the nozzle assembly (discussed below) is in a stowed position (shown in FIGS. 1 and 2).

During operation, ambient air 28 enters an inlet 30 of turbofan engine assembly 10 and flows past fan assembly 16. A combustion portion 32 of air 28 is channeled through core gas turbine engine 20, compressed, mixed with fuel, and ignited for generating combustion gases 34. Combustion gases 34 are discharged from an outlet 40 (also shown in FIG. 2) of an annular core duct 41 defined between core nozzle 36 and an optional center plug 42 (also shown in FIG. 2) disposed coaxially or concentrically therein around longitudinal axis/centerline 44. A bypass airflow 38, which is the bypass portion of air 28, is channeled downstream through annular bypass duct 26 and discharged from bypass duct 26 at an outlet 46. In some embodiments, turbofan engine assembly 10 includes a thrust reverser assembly (not shown).

Figure 2:
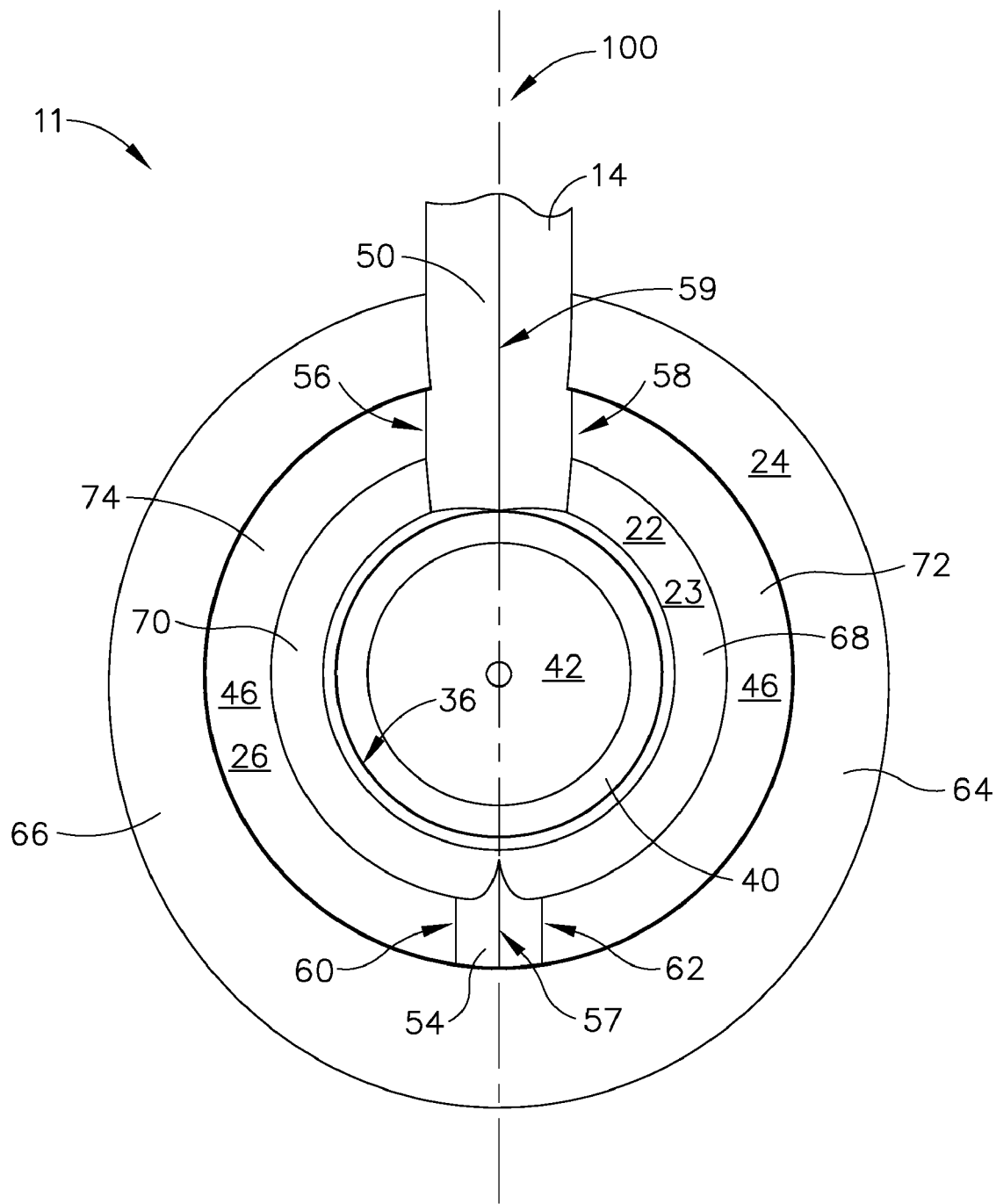
FIG. 2 is an end view of an exemplary nozzle assembly used with the turbine engine of FIG. 1.

FIG. 2 illustrates an end view of a nozzle assembly 11 from the perspective of centerline 44 (shown in FIG. 1). In one embodiment, nozzle assembly 11 is a bifurcated nozzle assembly. Nozzle assembly 11 includes nacelle 24, core cowl 22 (not shown in FIG. 2) including split cowl assembly 23, and outlet 46 of bypass duct 26. In the exemplary embodiment, nacelle 24 and core cowl 22 are coupled to wing 12 (shown in FIG. 1) by pylon 14. Nozzle assembly 11 includes a first member 50 and an opposing second member 54. Member 50 is substantially coplanar with pylon 14 and extends through an upper portion of nacelle 24, bypass duct 26, core cowl 22, and core nozzle 36. A conduit (not shown) is defined within and extends through pylon 14 and member 50. The conduit allows electrical communication for engine assembly 10 with a control system of the aircraft. While two members 50, 54 are shown in FIG. 2, any quantity can be used with nozzle assembly 11 provided that split cowl assembly 23 is reconfigured for suitable use.

Member 54 extends through a bottom portion of nacelle 24, core nozzle 36 and core cowl 22 and is substantially coplanar with pylon 14. In some embodiments, member 54 includes a strut or support member. As shown in FIG. 2, members 50, 54 are aligned substantially with a vertical plane defined by line 100. The vertical plane defined by line 100 includes centerline 44 and, in one embodiment, is substantially perpendicular to wing 12. Although typical installations of engine assembly 10 do not vary from the vertical plane shown in FIG. 2, other embodiments of the present invention exist. For example, engine assembly 10 could be mounted on a fuselage with a horizontal pylon. Split cowl assembly 23 is defined by at least the aft portions of members 50 and 54, nacelle 24, bypass duct 26, core cowl 22, and core nozzle 36. (See FIG. 2.)

Member 50 includes opposing sidewalls 56, 58, and member 54 includes opposing sidewalls 60, 62. Sidewalls 56, 58, 60, 62 extend through bypass duct 26 toward the forward end of engine assembly 10. Each member 50, 54 further defines a width (not shown) between opposing sidewalls 56, 58 and 60, 62, respectively. In one embodiment, the width of member 54 is less than a width of member 50. The conduits of members 50, 54 at least partially separate nacelle 24 and split cowl assembly 23 of core cowl 22 into substantially symmetrical arcuate nacelle portions, 64, 66 and arcuate cowl portions 68, 70, respectively. In some embodiments, arcuate nacelle portions 64, 66 of nacelle 24 are hingedly coupled to member 50. Members 50, 54 further divide bypass duct 26 forming substantially symmetrical duct portions, 72 and 74, respectively. Symmetrical duct portions 72, 74 may have any conventional configuration. In one embodiment, duct portion 72 is defined by a radially inner surface of arcuate nacelle portion 64, a radially outer surface of arcuate cowl portion 68, sidewall 58 of member 50, and sidewall 62 of member 54. Similarly, in one embodiment, duct portion 74 is defined by a radially inner surface of arcuate nacelle portion 66, a radially outer surface of arcuate cowl portion 70, sidewall 56 of member 50, and sidewall 60 of member 54.

Figure 3:
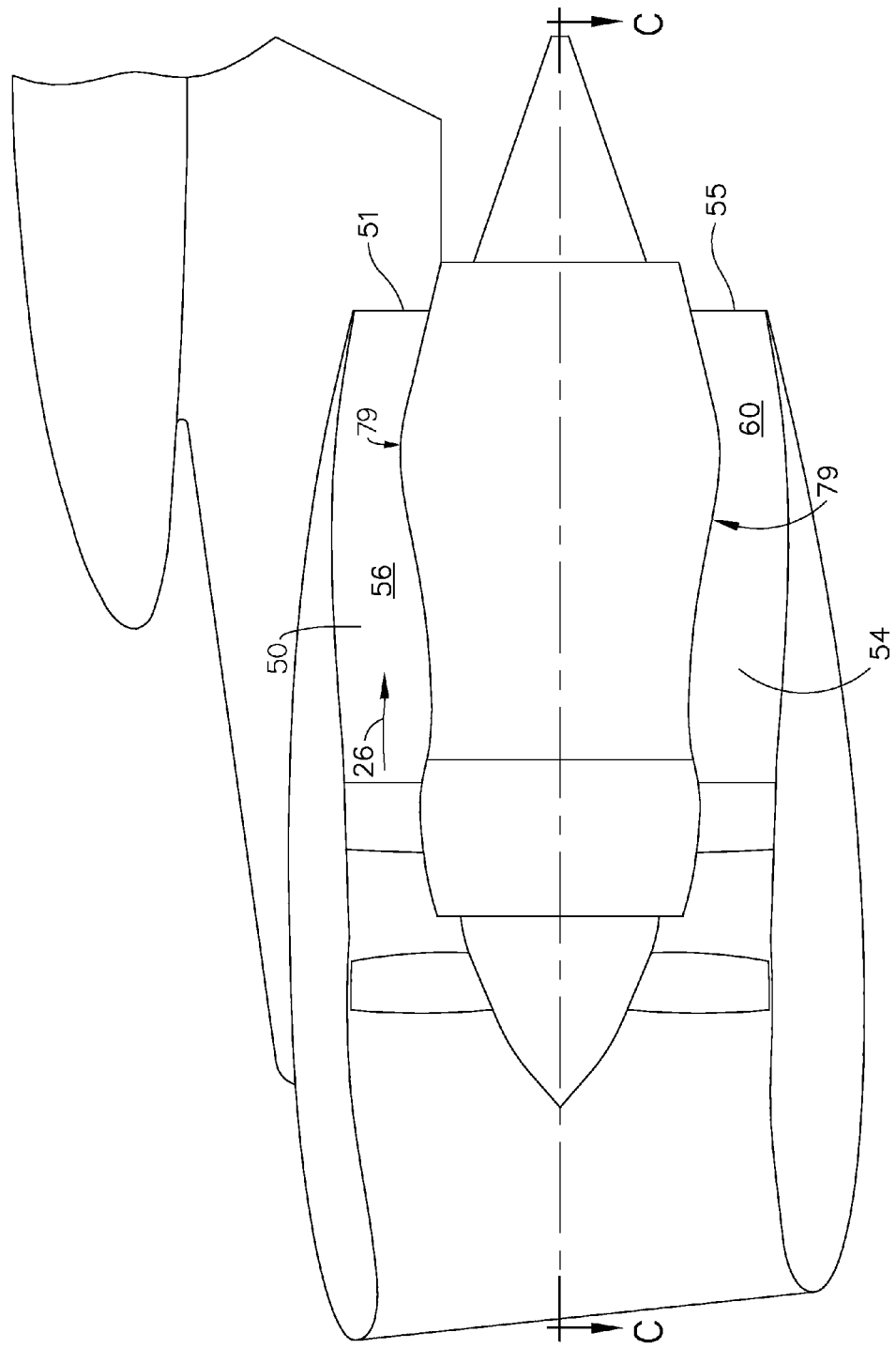
FIG. 3 is a side view of the exemplary nozzle assembly of FIG. 2.
Figure 4:
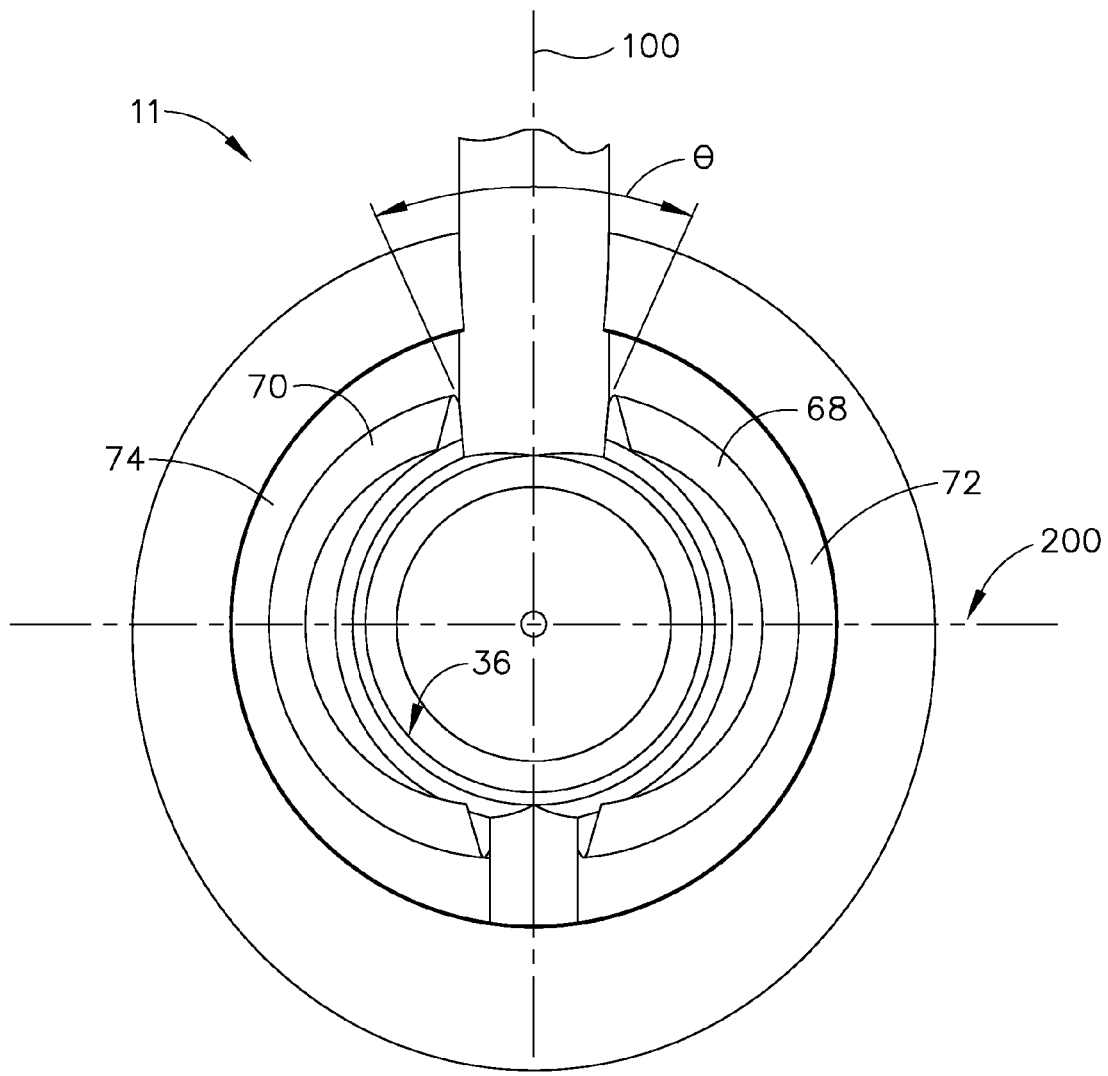
FIG. 4 is another end view of the exemplary nozzle assembly while the split cowl assembly is a second operational position.

FIG. 3 is a side view of the exemplary nozzle assembly 11. FIG. 4 is an end view of nozzle assembly 11 and split cowl assembly 23 in a deployed position. As shown in FIG. 3, core cowl 22 forms a bulge portion 79 that affects the contours of bypass duct 26. Bulge portion 79 surrounds the high-pressure turbine and low-pressure turbine (not shown). In one embodiment, each sidewall 56 and 58 (not shown) of member 50 are substantially parallel with the vertical plane defined by line 100. Each sidewall 56 and 58 extends to an edge 51 of member 50. Each sidewall 60 and 62 (not shown) of member 54 are substantially parallel with the vertical plane defined by line 100, and each sidewall 60 and 62 extends to an edge 55 of member 54. In one embodiment, edge 51 extends downstream further than edge 55. Furthermore, in one embodiment (as shown in FIG. 2), edge 55 of sidewalls 60 and 62 converge at an end portion 57. Likewise, edge 51 of sidewalls 56 and 58 converge at an end portion 59. In the exemplary embodiment, end portions 57, 59 have a triangular shape. In alternative embodiments, end portions 57, 59 have any suitable shape.

Embodiments of the present invention vary the throat area of bypass duct 26 for bypass airflow 38 (shown in FIG. 1). Reducing the fan nozzle duct area during certain operating conditions, such as take-off or descent, can improve fuel burn by raising the fan operating line closer to the peak efficiency line. In addition, reduced noise is achieved as a result of reduced fan wake/outlet guide vane (OGV) interaction. Moreover, opening the fan nozzle during certain operating conditions, such as low altitude, can also reduce noise as a result of reduced jet velocity. The noise reduction benefit of varying the fan nozzle (VFN) can also be traded to further reduce fan diameter and corresponding fuel burn.

Arcuate cowl portions 68 and 70 of split cowl assembly 23 are hingedly coupled to front cowl portion 21 (illustrated in FIGS. 7 and 8). As shown in FIG. 4, when nozzle assembly 11 is in operation, arcuate cowl portions 68, 70 are repositioned from a stowed position or first operational position 130 (FIGS. 2, 5, and 8) to a deployed position or second operational position 132 (FIGS. 4, 6, and 7). Cowl portions 68, 70 are repositioned with respect to the vertical plane defined by line 100 and are opened in a radially outward direction with respect to optional center plug 42 (i.e., moved along a horizontal plane defined by line 200). The area of duct portions 74, 72 is reduced by repositioning cowl portions 68, 70. Thus, when the engine experiences aerodynamic losses, such as during take-off or descent, arcuate cowl portions 68, 70 can be repositioned to improve fuel burn by raising the fan operating line closer to the peak efficiency line. Moreover, repositioning cowl portions 68, 70 can reduce the noise by reducing fan wake/OGV interaction.

Although FIGS. 2-4 show two members 50, 54 splitting the core cowl into two arcuate portions, other embodiments of the present invention exist. For example, engine assembly 10 could include four members, two within the vertical plane and two within a horizontal plane, splitting the core cowl into four arcuate portions.

In some embodiments, while arcuate cowl portions 68, 70 are being repositioned, an outer surface of each cowl portion is sufficiently close to an inner sidewall edge from each member such that the arcuate cowl portion is slidable, but does not allow a substantial amount of airflow to enter a volume of the conduit (not shown).

As shown in FIG. 4, the area of each duct portion 72, 74 at outlet 46 is reduced when arcuate cowl portions 68, 70 are repositioned. In one embodiment, after cowl portions 68 and 70 are repositioned, the area of outlet 46 is reduced by 30%. When cowl portions 68, 70 are repositioned, core nozzle 36 remains stationary. A total angle $\Theta$ is formed by arcuate cowl portions 68, 70 when repositioned (with the vertical plane defined by line 100 bifurcating angle $\Theta$). In some embodiments, angle $\Theta$ is less than or about equal to 12°. FIG. 4 shows an exaggerated angle $\Theta$ for illustrative purposes. In some embodiments, angle $\Theta$ formed by arcuate cowl portions 68, 70 is approximately 8°.

Figure 5:
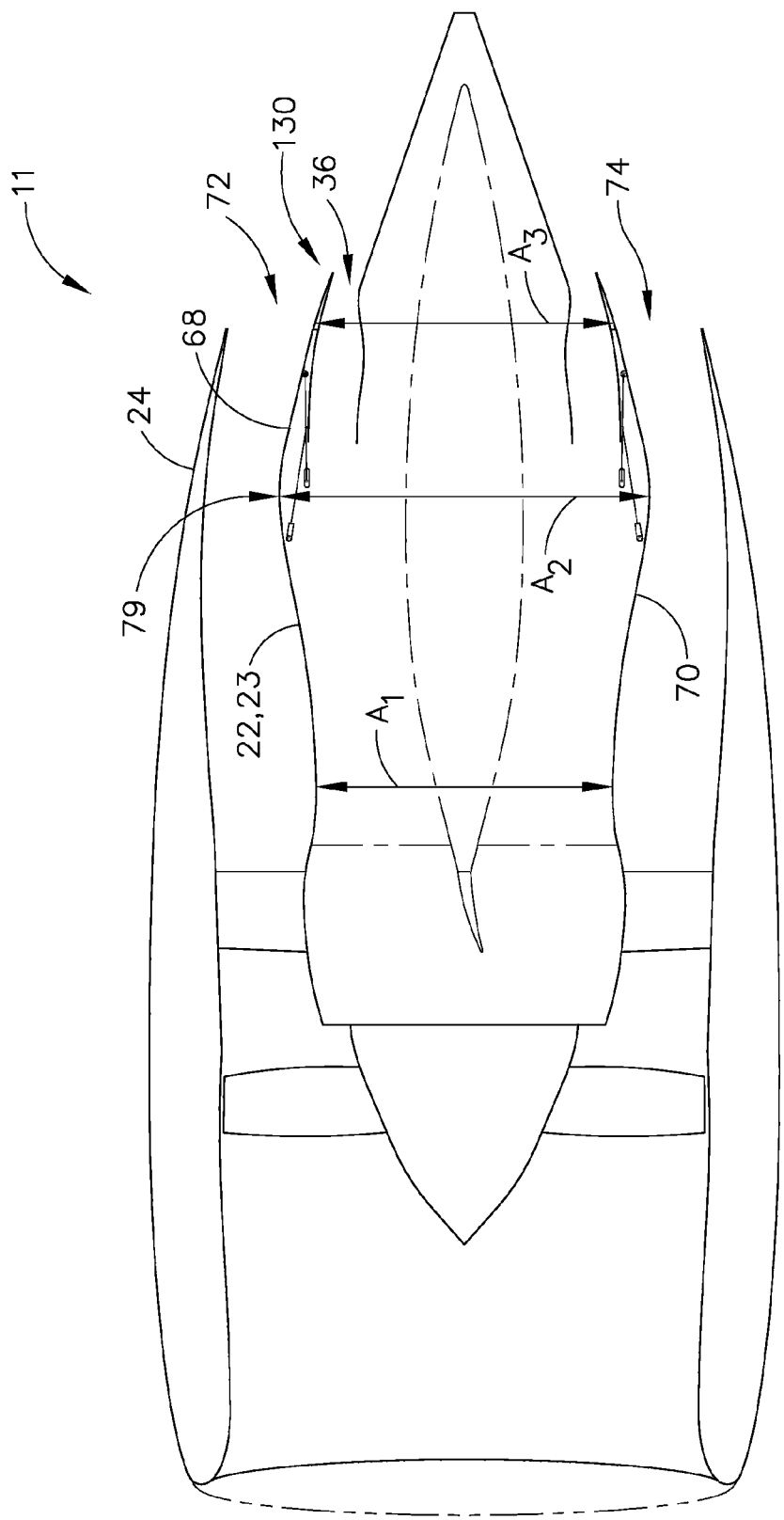
FIGS. 5 and 6 illustrate an outline view of the nozzle assembly shown in FIG. 3.
Figure 6:
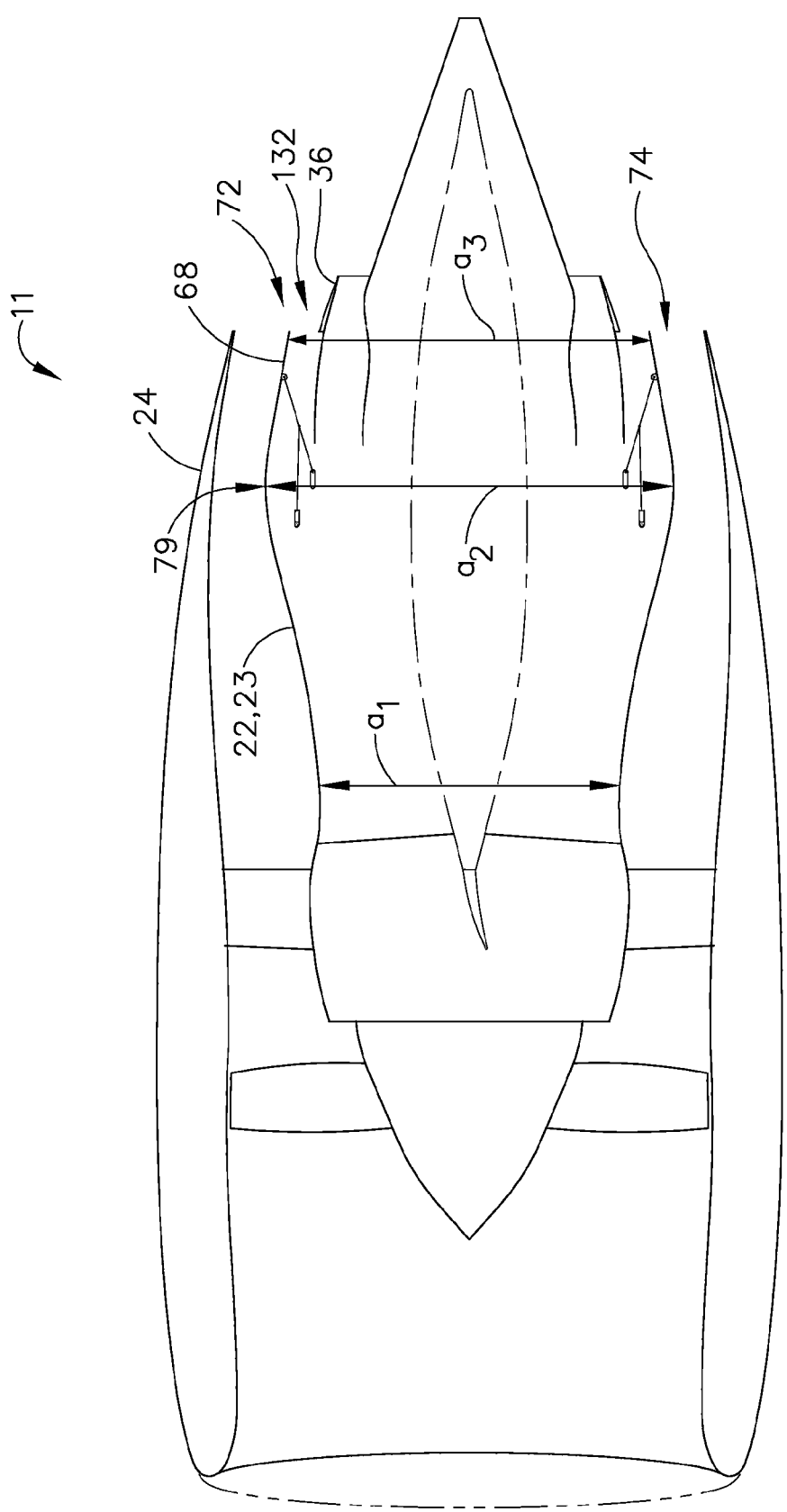

FIGS. 5 and 6 illustrate an outline of nozzle assembly 11 from the C-C perspective in FIG. 3. FIG. 5 illustrates nozzle assembly 11 in a first operational position 130. When in the first operational position 130, split cowl assembly 23 is in a fully retracted position adjacent core nozzle 36. The shape of bulge portion 79 is illustrated by a first area $A_1$, a second area $A_2$, and a third area $A_3$. First area $A_1$ is located upstream from nozzle assembly 11, second area $A_2$ is positioned downstream from first area $A_1$, and third area $A_3$ is positioned downstream from second area $A_2$. In the exemplary embodiment, first area $A_1$ and third area $A_3$ are less than second area $A_2$.

FIG. 6 illustrates nozzle assembly 11 in a second operational position 132, wherein the cowl portions 68, 70 are extended from core nozzle 36 in a radially outward direction. As shown in FIG. 6, bulge portion 79 is illustrated by a first area $a_1$, a second area $a_2$, and a third area $a_3$. Areas $a_1$, $a_2$, $a_3$ are measured along core cowl 22 at substantially the same locations as areas $A_1$, $A_2$, and $A_3$, respectively, are measured. When nozzle assembly 11 is deployed and cowl portions 68, 70 move into second operational position 132, the areas of duct portions 72, 74 decrease. As can be seen by comparing FIGS. 5 and 6, areas $a_1$, $a_2$, $a_3$ are greater than corresponding areas $A_1$, $A_2$, and $A_3$.

Deployment of the arcuate cowl portions 68, 70 is generally accomplished by using links, actuators, or other mechanisms. FIG. 7 illustrates split cowl assembly 23 in second operational position 132. FIG. 8 illustrates split cowl assembly 23 in first operational position 130. In one embodiment, each cowl portion 68, 70 is coupled by a hinge 102 to front cowl portion 21. For illustrative purposes, only cowl portion 68 is shown in FIGS. 7 and 8, but the following also applies to cowl portion 70. Each side of core gas turbine engine 20 includes an actuator 101 that includes at least one motor 104 that is used to move arcuate cowl portions 68, 70 radially outward with respect to horizontal plane defined by line 200. Actuator 101 facilitates selectively moving the arcuate portion at an angle relative to front cowl portion 21. Actuator 101 includes a motor 104, an extending rod 106 coupled to motor 104 and also to a link 110. Link 110 connects the corresponding cowl portion to a slot 108 such that energizing the motors facilitates moving the cowl portion in either an outward direction along the horizontal plane or an inward direction. In one embodiment, actuator 101 may be electrically, pneumatically, or hydraulically powered to facilitate moving the corresponding arcuate portion between a first operational position and a second operational position (for example, stowed position and a fully deployed position).

The present invention also includes a method of operating a turbofan engine assembly including a core gas turbine engine. The method includes varying an operating speed of the turbofan engine assembly from a first operating speed to a second operating speed. The method also includes selectively positioning a first arcuate portion and a second arcuate portion of a split cowl assembly to vary a throat area of a fan nozzle duct defined downstream from the core gas turbine engine to facilitate improving engine efficiency at the second operating speed. The split cowl assembly is downstream from the core gas turbine engine and inside the fan nozzle duct.

Described herein is a nozzle assembly that may be utilized on a variety of turbofan gas turbine engines coupled to an aircraft. Specifically, the split cowl assembly described herein reduces fuel burn and engine noise during certain flight conditions by reducing the bypass duct dimensions (i.e., the area of the outlet and volume of the duct). More specifically, the arcuate portions while in the second operational position reduce the available space for airflow. The nozzle assembly is a relatively low cost and low weight modification to the turbofan engine. By improving the engine efficiency during take-off and descent with use of the nozzle assembly, the engine has approximately a 1.0% better fuel-burn than other known engines with a dimension defined between the core cowl and the nacelle that is fixed.

An exemplary embodiment of a nozzle assembly for a gas turbine engine is described above in detail. The assembly illustrated is not limited to the specific embodiments described herein, but rather, components of each assembly may be utilized independently and separately from other components described herein.

While the invention has been described in terms of various specific embodiments, those skilled in the art will recognize that the invention can be practiced with modification within the spirit and scope of the claims.

What is claimed is:

1. A method for operating a turbofan engine assembly including a core gas turbine engine, said method comprising:
varying an operating speed of the turbofan engine assembly from a first operating speed to a second operating speed; and
selectively positioning a first arcuate portion and a second arcuate portion of a split cowl assembly to vary a throat area of a fan nozzle duct defined downstream from the core gas turbine engine to facilitate improving engine efficiency at the second operating speed, wherein the split cowl assembly is coupled downstream from the core gas turbine engine and inside the fan nozzle duct.

2. A method in accordance with claim 1 wherein selectively positioning a first arcuate portion and a second arcuate portion of a split cowl assembly further comprises positioning each arcuate portion at an angle to facilitate maximizing engine efficiency.

3. A method in accordance with claim 1 wherein selectively positioning a first arcuate portion and a second arcuate portion of a split cowl assembly further comprises positioning each arcuate portion at an angle so that the throat area of the fan nozzle duct is maximized.

4. A method in accordance with claim 2 wherein positioning each arcuate portion at an angle with respect to a vertical plane further comprises positioning each arcuate portion at an angle from about 0° to about 6°.

5. A nozzle assembly for a gas turbine aircraft engine, said nozzle assembly comprising:
a nacelle;
a core cowl positioned at least partially within said nacelle such that an annular bypass fan duct is defined between, said core cowl and said nacelle are aligned substantially concentrically with respect to each other, said core cowl comprises:
a first cowl portion positioned within said nacelle; and
a split cowl assembly extending downstream from said first cowl portion, said split cowl assembly comprising a pair of arcuate portions, each of said arcuate portions is repositionable within said bypass fan duct to vary an area of said bypass fan duct.

6. A nozzle assembly in accordance with claim 5 wherein said nozzle assembly further comprises:
a first member positioned within said bypass fan duct and coupled to said nacelle, said first member comprises opposing sidewalls; and
a second member positioned within said bypass fan duct and coupled to said nacelle, said second member opposite said first member and comprising opposing sidewalls.

7. A nozzle assembly in accordance with claim 6 wherein said first member has a first width measured between said first member sidewalls, said second member has a second width measured between said second member sidewalls, said second member width is narrower than said first member width.

8. A nozzle assembly in accordance with claim 6 wherein said second member sidewalls define an aft end portion of said second member, said second member aft end portion having a triangular shape.

9. A nozzle assembly in accordance with claim 5 wherein said nozzle assembly is configured to reposition said arcuate portions to form an angle.

10. A nozzle assembly in accordance with claim 9 wherein said angle formed by one arcuate portion is from about 0° to about 6°.

11. A nozzle assembly in accordance with claim 5 wherein said nozzle assembly further comprises a plurality of actuators configured to reposition said split cowl assembly, each of said plurality of actuators extends between a respective one of said arcuate portions and a static portion of said core cowl.

12. A nozzle assembly in accordance with claim 11 wherein each of said plurality of actuators comprises an extending rod configured to variably position said respective arcuate portion in one of a radially outward direction and a radially inward direction.

13. A turbofan engine assembly comprising:
a core gas turbine engine;
a nacelle; and
a core cowl positioned at least partially within said nacelle such that an annular bypass fan duct is defined between, said core cowl and said nacelle are aligned substantially concentrically with respect to each other, said core cowl comprises:
a first cowl portion positioned within said nacelle; and
a split cowl assembly extending downstream from said first cowl portion, said split cowl assembly comprising a pair of arcuate portions, each of said arcuate portions is repositionable within said bypass fan duct to vary an area of said bypass fan duct.

14. A turbofan engine assembly in accordance with claim 13 wherein said turbofan engine assembly further comprises:
a first member positioned within said bypass fan duct and coupled to said nacelle, said first member comprises opposing sidewalls; and
a second member positioned within said bypass fan duct and coupled to said nacelle, said second member opposite said first member and comprising opposing sidewalls.

15. A turbofan engine assembly in accordance with claim 14 wherein said first member has a first width measured between said first member sidewalls, and said second member has a second width measured between said second member sidewalls, said second member width is narrower than said first member width.

16. A turbofan engine assembly in accordance with claim 13 wherein said turbofan engine assembly is configured to reposition said arcuate portions to form an angle.

17. A turbofan engine assembly in accordance with claim 16 wherein said angle formed by one arcuate portion is from about 0° to about 6°.

18. A turbofan engine assembly in accordance with claim 13 wherein said turbofan engine assembly further comprises a plurality of actuators configured to reposition said split cowl assembly, each of said plurality of actuators extends between a respective one of said arcuate portions and a static portion of said core cowl.

19. A turbofan engine assembly in accordance with claim 18 wherein each of said plurality of actuators comprises an extending rod configured to variably position said respective arcuate portion in one of a radially outward direction and a radially inward direction.

* * * * *